(12) United States Patent  
Duchateau et al.

(10) Patent No.: US 8,016,341 B2  
(45) Date of Patent: Sep. 13, 2011

(54) STOWABLE SEAT

(75) Inventors: Jean Duchateau, Pont Salomon (FR); Patrick Faye, Montrond les Bains (FR); Jean Claude Aumond, Montbrison (FR); Pascal Kliminowski, Montenois (FR)

(73) Assignees: Grupo Antolin-Ingenieria (ES); Peugeot Citroen Automobiles (FR)

( * ) Notice: Subject to any disclaimer, the term of this patent is extended or adjusted under 35 U.S.C. 154(b) by 494 days.

(21) Appl. No.: 11/574,711

(22) PCT Filed: Jul. 20, 2005

(86) PCT No.: PCT/FR2005/001863  
§ 371 (c)(1),  
(2), (4) Date: Jul. 15, 2009

(87) PCT Pub. No.: WO2006/027441  
PCT Pub. Date: Mar. 16, 2006

(65) Prior Publication Data  
US 2010/0213734 A1 Aug. 26, 2010

(30) Foreign Application Priority Data  
Sep. 6, 2004 (FR) ...................... 04 09406

(51) Int. Cl.  
*B60N 2/30* (2006.01)
(52) U.S. Cl. ..................... 296/65.16; 297/335
(58) Field of Classification Search ............ 296/65.16; 297/335, 331, 367, 378.12  
See application file for complete search history.

(56) References Cited

U.S. PATENT DOCUMENTS

| 6,902,236 | B2 * | 6/2005 | Tame ............................ 297/335 |
| 7,367,625 | B2 * | 5/2008 | Mori et al. ............... 297/378.12 |
| 7,413,251 | B2 * | 8/2008 | Link ............................ 297/334 |
| 2004/0061371 | A1 | 4/2004 | Tame |

FOREIGN PATENT DOCUMENTS

| DE | 10239112 | 3/2004 |
| FR | 2826321 | 12/2002 |
| FR | 2829441 | 3/2003 |
| WO | WO2004043730 | 5/2004 |

OTHER PUBLICATIONS

International Search Report; PCT/FR2005/001863; Jan. 27, 2006.

* cited by examiner

*Primary Examiner* — Joseph Pape  
(74) *Attorney, Agent, or Firm* — Cantor Colburn LLP

(57) ABSTRACT

A motor vehicle seat comprises a backrest (3), a seating surface (2) connected to the backrest (3) by a pivotable connection (P1) and to the vehicle floor by a front leg support (P2). The inventive stowable seat also comprises a swing arm (7) connected to the backrest and the floor by two pivot joints (P4,P5), wherein the seat is movable between an unfolded state when the seating surface (2) is substentially parallel to the floor, the backrest (3) is in a substentially vertical position and, each swing arm (7) is placed in the backrest (3) extension, thereby enabling it to be upwardly displaced and a folded state when the backrest (3) is folded substantially horizontally onto the seating surface (2). During the transition from the unfolded state to the folded state, each swing arm (7) pivots in a direction opposite to the pivoting direction of the backrest (2) in such a way that it is placed therealong

14 Claims, 13 Drawing Sheets

STOWABLE SEAT

TECHNICAL FIELD OF INVENTION

The present invention relates to a stowable motor-vehicle seat that can occupy an unfolded position in which a passenger can sit on it and a folded position in which the seat is stowed in the floor of the vehicle.

BRIEF DESCRIPTION OF RELATED ART (It should be made clear at the outset that terms such as up, down, front, rear, longitudinal, transverse, horizontal and vertical are given with reference to the reference frame of a vehicle.)

Some vehicles, notably of the people carrier or station wagon type, have seats of row 1 between the vehicle's front doors, seats of row 2 between the vehicle's rear doors, and seats of row 3 behind the seats of row 2; these seats are therefore in the compartment of the passenger cabin which usually forms the trunk. The seats of row 3 may be removable or stowable.

In the latter case a well is provided in the floor of the trunk of vehicle in which the seat can be folded away when not in use. The seat folds up in such a way as to fit completely inside the well so that the floor of the trunk is essentially flat and can be used for transporting objects.

Examples of seats of this kind can be found in documents FR-A-2 826 321 and FR-A-2 829 441.

A recurring problem with stowable seats of row 3 is that, in order to be stowed in a well whose longitudinal (in the reference frame of the vehicle) dimension is limited, the backrest of the seat is relatively short. In other words, in order to be able to be stowed in a well having a given limited longitudinal dimension, the seat itself must have a backrest whose dimension enables it to fit in the well. As a result, vehicles are equipped with row 3 seats whose backrest is too small to provide satisfactory comfort to a passenger sitting in it or to restrain a passenger safely in the event of an accident.

BRIEF SUMMARY OF THE INVENTION

The invention provides a seat which, while being stowable in a small space, has a backrest that provides comfort and safety to an occupant.

The invention essentially relates to a motor vehicle seat comprising:
  a backrest, and
  a thigh support connected to the backrest by a pivot connection and to the vehicle floor by a front underframe,
characterized in that it comprises:
  at least one oscillating arm connecting, by two pivot connections, the backrest to the structure of the vehicle, the seat being movable between:
  an unfolded condition in which the thigh support is approximately parallel to the floor and the backrest approximately vertical, each oscillating arm here being in line with the backrest, so that the backrest is displaced upward, and
  a folded condition in which the backrest is closed down approximately horizontally on the thigh support,
and, when moving from the unfolded condition to the folded condition, each oscillating arm pivots in a direction opposite to the pivoting direction of the backrest to finish up alongside the backrest.

The basic idea of the invention is thus to shift the backrest upward when the seat is in its unfolded condition. The member which makes this shift possible is the oscillating arm which forms a continuation of the line of the backrest. With this arrangement, in its unfolded state the seat offers a useful passenger supporting surface that is equal to the sum of the length of the backrest and the length of the oscillating arm. It can thus be seen that the useful passenger supporting surface is greater than the actual length of the backrest which, it will be remembered, is determined by the longitudinal dimension of the storage space. In other words the invention provides a seat which, in its unfolded condition, offers a useful passenger supporting surface whose length exceeds the longitudinal dimension of the storage space in which the seat will have to be stowed. This is a fundamental advantage over the seats of the prior art in which the longitudinal dimension of the storage space decides the length of the backrest; since this longitudinal dimension is affected by considerations of the general size of the vehicle, the length of the backrest is limited by this dimension.

When the seat is in the folded condition, the oscillating arm lies alongside the backrest. In this condition of the seat the presence of the oscillating arm is therefore transparent as far as the longitudinal dimension of the seat is concerned.

The benefits in terms of the comfort and safety of a passenger of average height are therefore very clear because the passenger benefits from a seat that supports the whole of his back.

In one particularly advantageous provision of the invention, the seat in its folded condition is housed in a well let into the floor of the vehicle, the length of the backrest being less than or equal to the longitudinal dimension of the well.

Besides providing superior comfort and safety than the seats of the prior art, the seat according to the invention can be folded down into a well bounded by four walls rather than a well bounded by three walls and open on one of its faces, as is the case with many prior-art seats.

Notice also that, because of the opposing rotational movements of the oscillating arm and backrest, the seat is able to unfold above the well rather than, as in many prior-art seats, in front of it.

The seat, thus defined, can be thought of as a polygon with four sides defined by the thigh support, the underframe of the thigh support, the backrest and the oscillating arm(s), having five pivots; as a result, the movement of the seat may be unoriented or undefined. In other words, when a user attempts either to fold the seat down from its unfolded position, or unfold it from its stowed position, the seat could behave in a random fashion.

To avoid this problem, the invention provides that the seat has guide means for the backrest when the seat is being moved from its unfolded position to its folded position.

The function of these guide means is to force the backrest to follow a given path.

In one advantageous embodiment, the backrest is provided with at least one roller that travels, when the seat is moving, in a rail connected to the floor.

In order for the connection between the rail and the backrest not to make the backrest longer, which would be contrary to the primary object of the invention, each rail is connected by a pivot connection to the floor, and forms an acute angle with the floor when the seat is in its unfolded condition and forms a null angle with the floor when the seat is in its folded condition. In this way the rail causes no interference when the seat is in the folded position, since it is built into the floor. Moreover, because of the pivot connection by which it is connected to the floor, it is able to pivot up above the level of the floor.

In one advantageous embodiment, the end of each rail is fitted with a pressing having a slot that houses a pin projecting from each oscillating arm.

The seat preferably comprises two oscillating arms situated on the outer faces of the backrest.

The front underframe advantageously possesses two parallel legs between which a headrest supported by the backrest is engaged.

The seat preferably comprises two rails, with a roller traveling in each of them.

To keep the seat in the unfolded position, it comprises first means for locking the upper part of the backrest relative to the lower part of the backrest and second means for locking the lower part of the backrest relative to the floor.

It advantageously comprises means for sequencing the first locking means and second locking means which, when the seat is in the unfolded position, allow initially the first locking means and then the second locking means to be released. It is of course important to provide sequencing means to sequence the unlocking of the two parts of the backrest in a defined order: the upper part of the backrest must be unlocked first so that it can be closed down towards the thigh support, and then the lower part of the backrest can be unlocked to allow it to swing down towards the floor.

In one embodiment of the seat, the backrest is fitted with at least one hook that pivots between a backrest-locked position in which the hook is engaged on a pin projecting from an arm, and a backrest-unlocked position in which the hook is disengaged from the pin, allowing the seat to rotate relative to the arm.

For the purpose of locking at least one of the arms relative to one of the brackets, on the outer face of each arm is a pin engaging in an L-shaped slot that has an elongate part and a recess, the slot being formed in a strut with a pivot relative to the bracket between a position in which each arm is locked relative to the bracket such that the pin is immobilized in the recess of the L-shaped slot, and a position in which each arm is unlocked relative to the bracket such that the pin can travel along the elongate part of the slot.

In one possible version, the strut is kept in its position of locking the arm relative to the bracket by a tension spring and comprises a ramp against which a cam connected to the backrest bears during the rotation of the backrest in order to release the pin from the recess of the slot and unlock the arm from each bracket.

BRIEF DESCRIPTION OF THE DRAWINGS

To enable the invention to be understood more clearly, it will now be described with reference to the enclosed drawing which shows by way of non-restrictive example an embodiment of a seat in accordance with the invention.

DETAILED DESCRIPTION OF THE INVENTION

Figure 1:
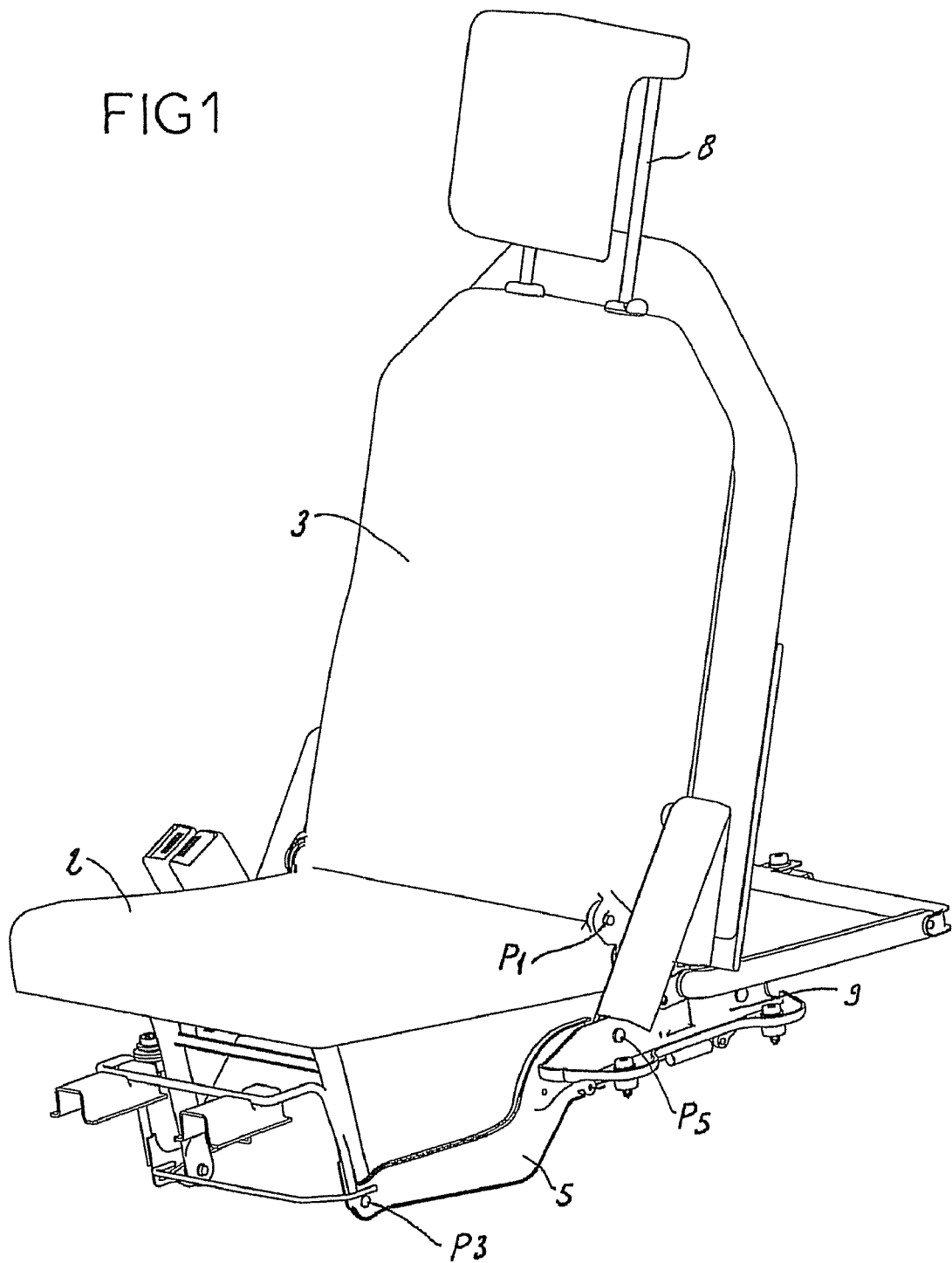
FIG. 1 shows the seat in perspective in its unfolded condition.

The seat in its embodiment shown in the drawing possesses a thigh support 2 and a backrest 3, both upholstered as shown in FIG. 1. The thigh support 2 is hinged to the backrest 3 by two pivot connections P1. A front underframe consisting of two parallel legs 4 connects the front of the thigh support 3 to the forward end of two metal plates 5.

The backrest 3, which pivots on the thigh support by the connection P1, is also connected to two oscillating arms 7. These two arms 7 are located on either side of the backrest 3: each oscillating arm 7 is connected to the backrest 3 by a pivot connection P4, and to a bracket 9 by a pivot connection P3. Each of the brackets 9 is a welded continuation of a metal plate 5.

As is conventional, the backrest 3 is fitted with a retractable headrest 8. It will also be seen that the rear face of the backrest 3 receives a plate 10 which projects beyond the outline of the backrest 3.

It will therefore be seen that, in the seat according to the invention, the backrest 3 is connected rotatably to the thigh support 2 and to two oscillating arms 7 which also pivot relative to their support, in this case the two metal plate 5/bracket 9 subassemblies. The seat is attached to the floor of a vehicle by bolts through each bracket 9.

Figure 3:
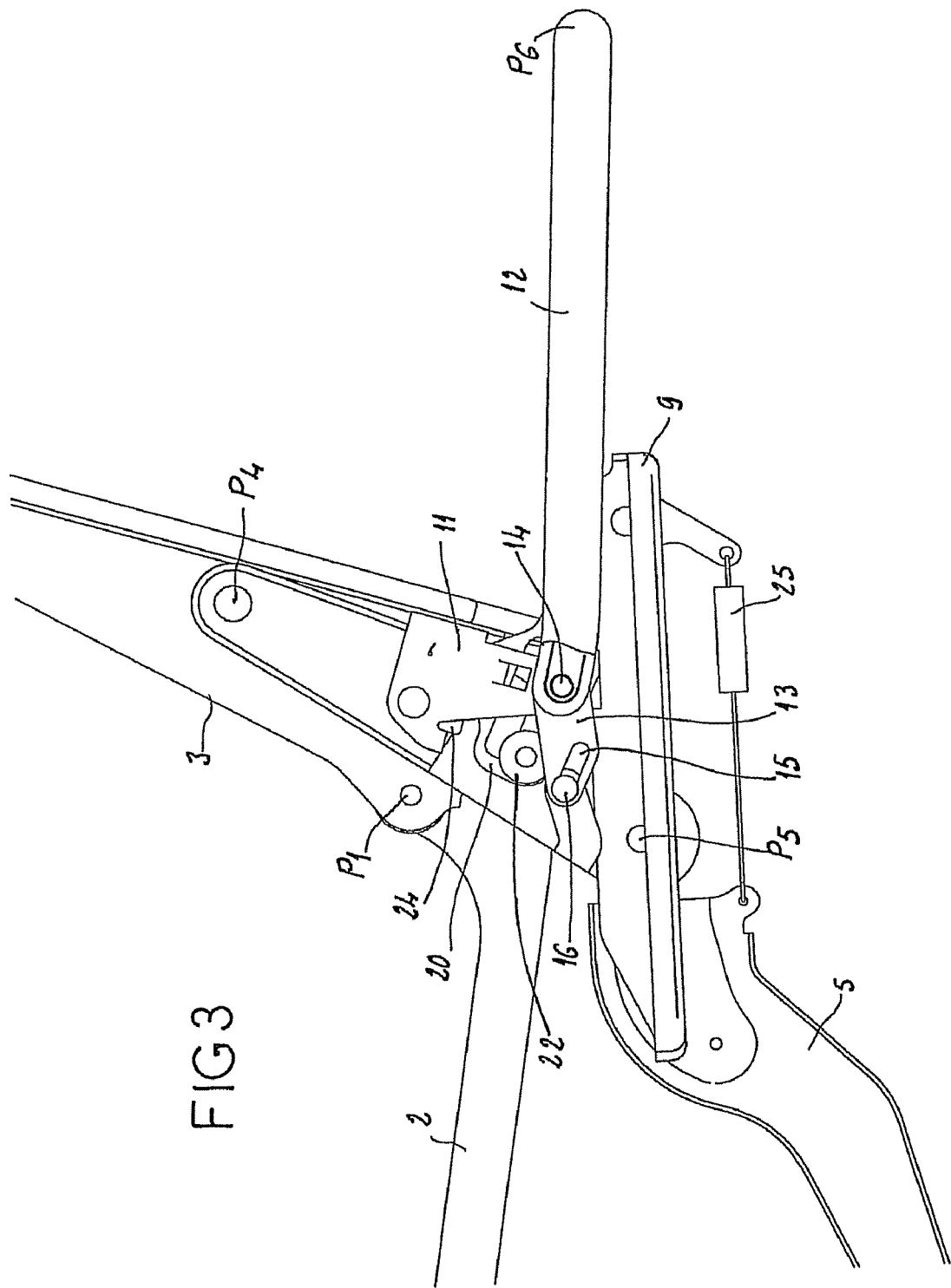
FIGS. 3-8 show the seat moving from its unfolded condition to its folded condition.
Figure 4:
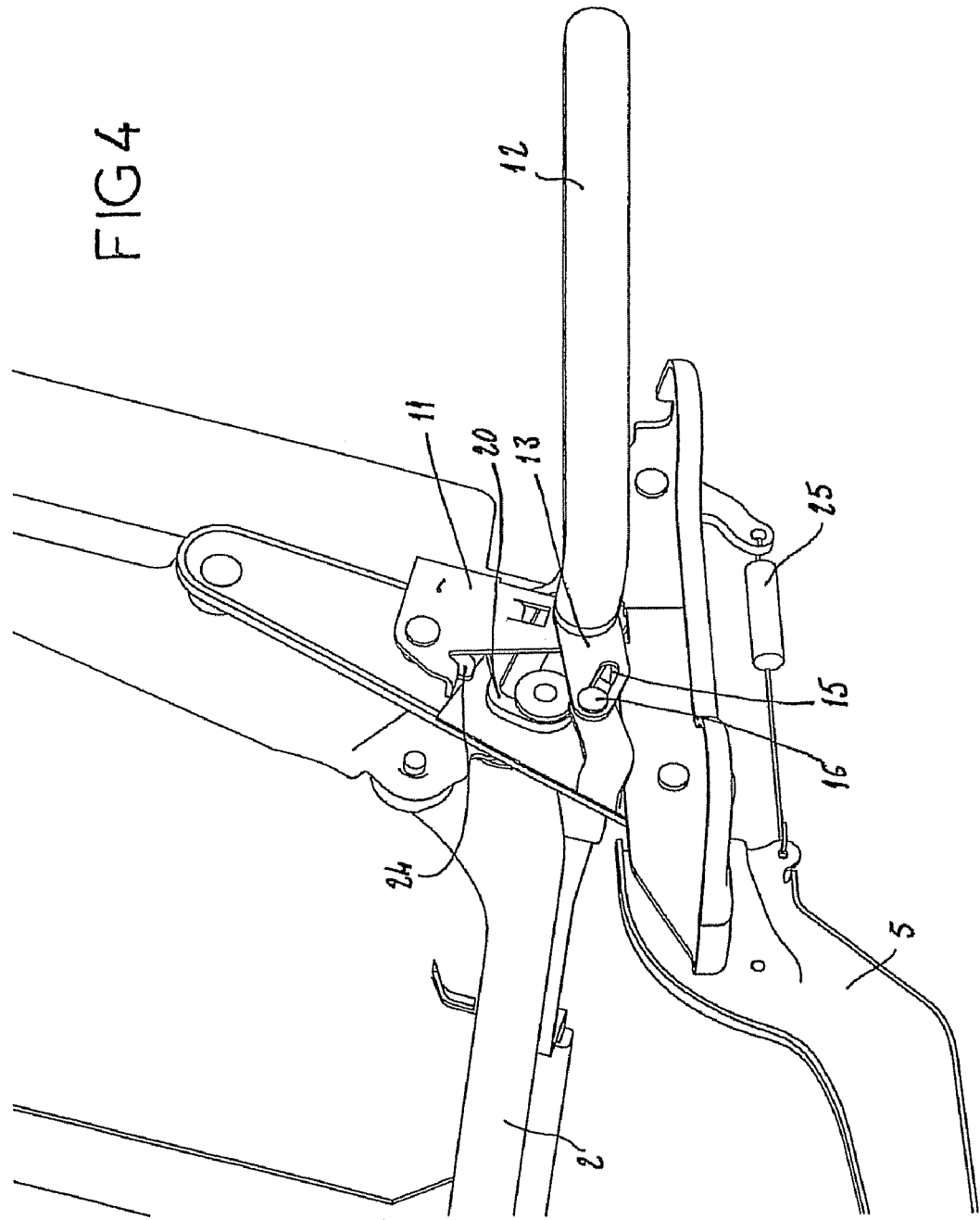

Another important point about the seat is that there are two rails 12 at its rear. The rear end of each of these rails 12 is attached by a pivot connection P6 to the vehicle floor, allowing them to rotate relative to the latter. The front end of each rail 12 is connected to the backrest 3 by a sliding connection G1. This sliding connection G1 takes the form of a roller 14 connected to the backrest 3 via a support plate 11. The roller 14 can be seen in FIG. 3, in which the end of one of the rails 12 is shown with partial cutaway.

Each support plate 11, which is supported by the backrest 3, receives a cam 24 whose function, during locking, will be explained later.

It may be noted that, if each sliding connection G1 is formed by two rollers 14 traveling in rails 12, it would also be possible to create this connection by a simple pin engaged in each rail 12.

Another component is involved in the connection of each rail 12 to its respective oscillating arm 7. This is a pressing 13 attached to the forward end of each rail 12. Each of the pressings 13 contains an elongate slot 15 in which a pin 16 is engaged. This pin 16 projects from each arm 7 and engages in the slot 15.

The seat is also fitted with locking means for holding it in the unfolded position.

For the description of the locking means, more particular reference will be made to FIGS. 9-12.

These locking means are present on either side of the oscillating arms 7.

Figure 9:
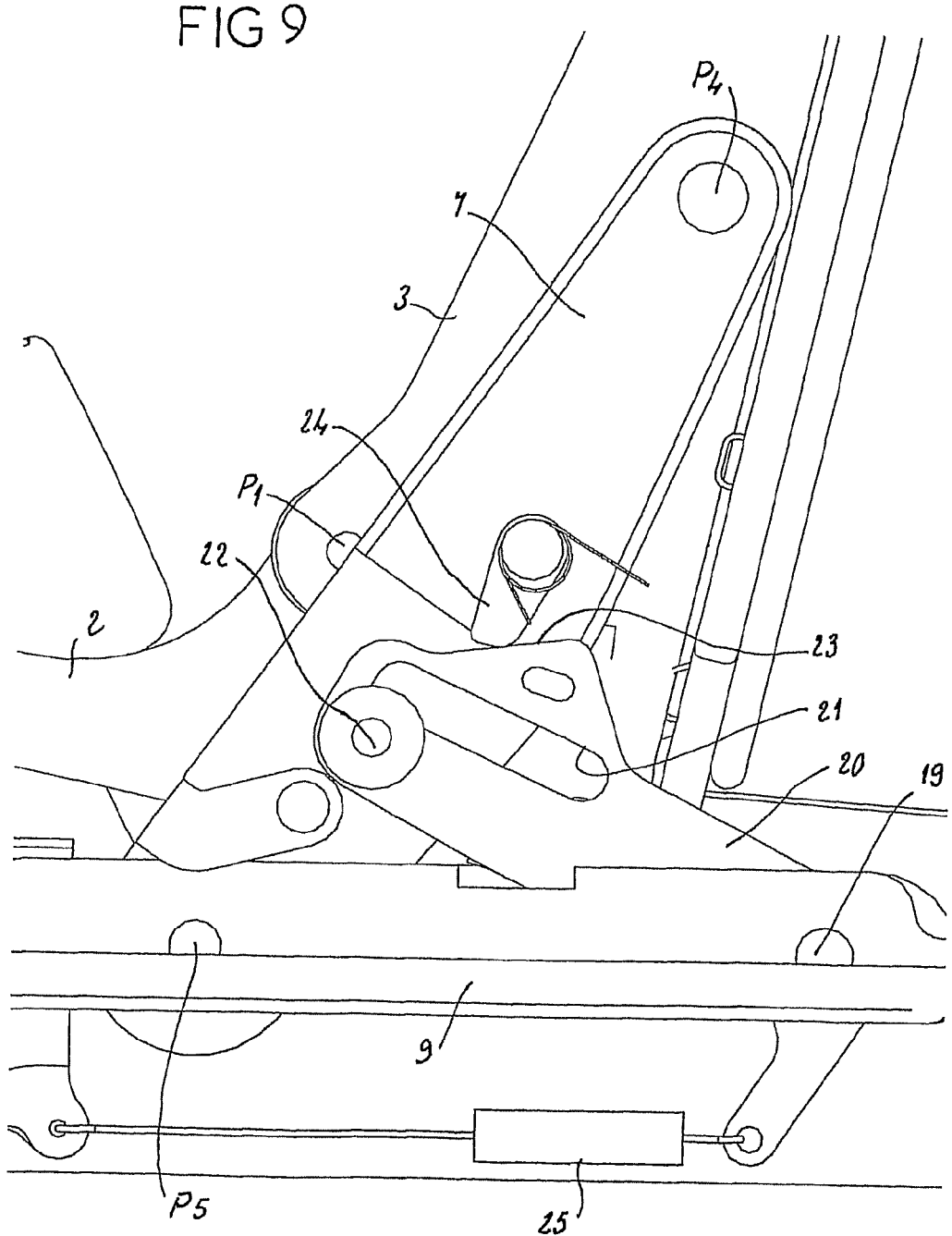
FIGS. 9-12 are side views of the locking means of the seat.

Referring to FIG. 9, in which the rail 12 and its pressing 13 are not shown, it can be seen that the seat is fitted with a strut 20 hinged by a pin 19 to the bracket 9. The strut 20 contains an elongate slot 21 having a recess, the slot 21 being L-shaped. A pin 22 projecting from the arm 7 is engaged in the recess of the slot 21.

The strut 20 also has a ramp 23 on which the cam 24 suspended from the support plate 11 can bear.

In the unfolded position of the seat, the pin 16 is locked in the recess of the slot 21, which locks the oscillating arm 7 relative to the bracket 9. Keeping the strut 20 in this position is a tension spring 25 with one end hooked to the far end of the strut 20 from the end containing the slot 21, the pin 19 being between the two.

Figure 10:
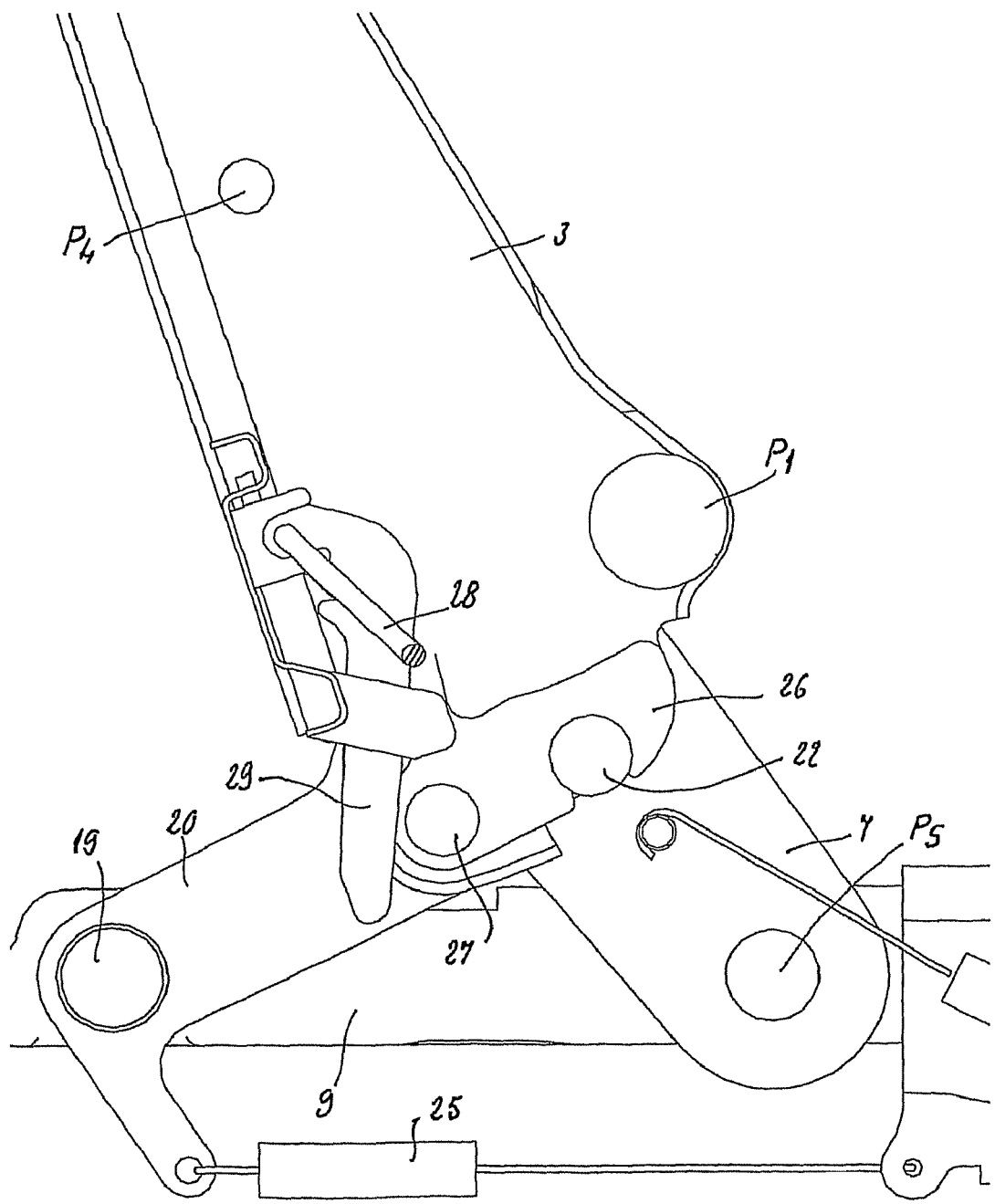

Turning to FIG. 10, which is a view from the inside of the seat, it will be seen that the backrest is fitted with a hook 26 pivoted to the backrest 3 by a pin 27. When the seat is in the unfolded position, the hook 26 is engaged in the pin 22 which projects from the arm 7.

To operate the hooks 26 and release them from the pin 22, they are connected to a rod 28 which in turn is connected to two pivoting hooked wires 29.

It can also be observed that in an unfolded condition the legs 4 of the seat are supported by a front end stop 18 connected to the vehicle floor, by a transverse rod which clicks into two grooves in the end stop.

The kinematics of the operation of the seat can now be seen.

Figure 2:
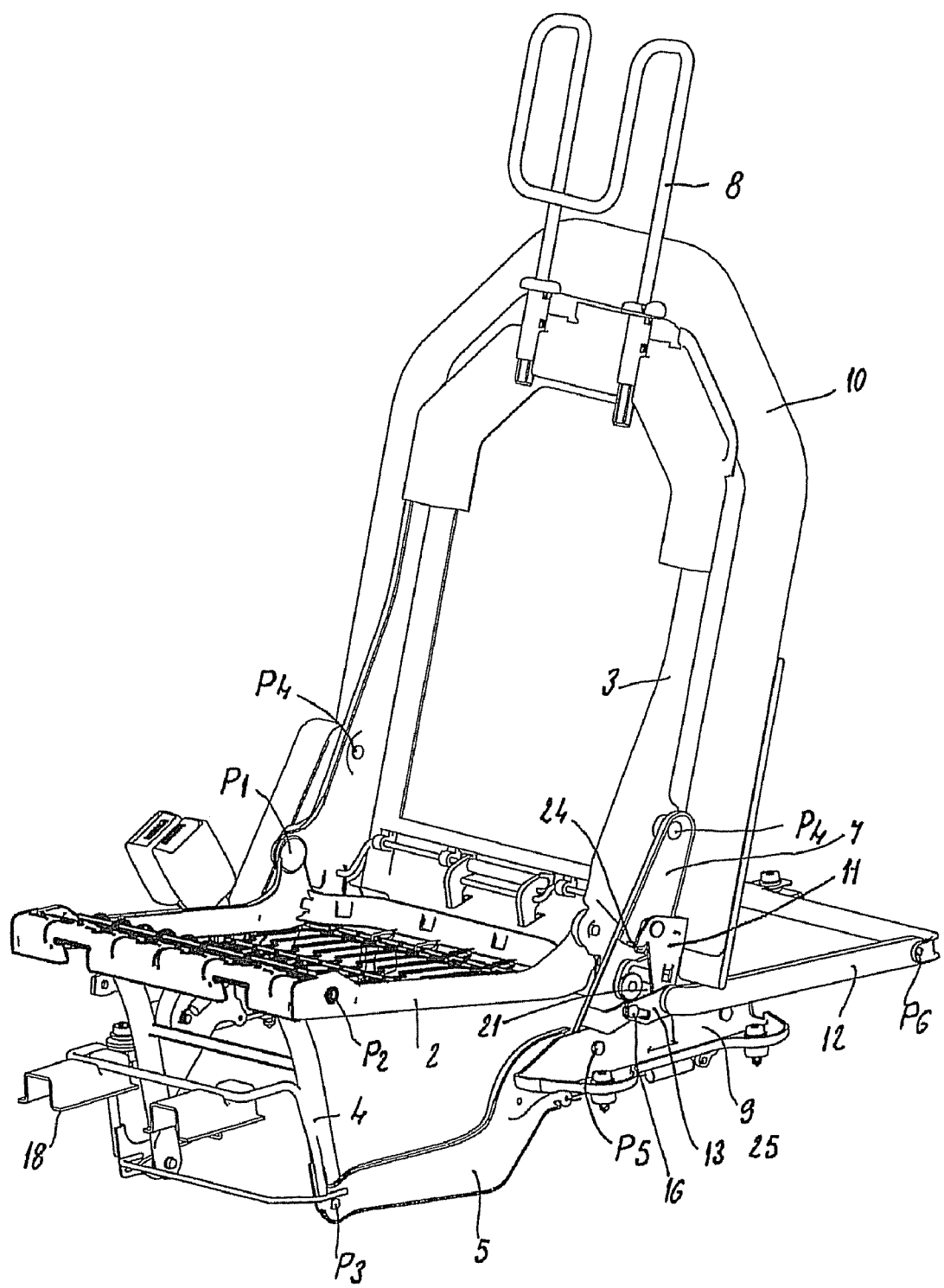
FIG. 2 shows the seat in perspective, its upholstery removed to show the structure of the seat.

Referring initially to FIG. 2, which shows the seat in its unfolded condition, that is a position in which the thigh support 2 is roughly parallel to the floor and in which the backrest 3 is approximately upright; in this condition of the seat, the rails 12 form an acute angle with the floor. In other words, the end of each rail 12 which receives the roller 14 is above the floor.

In this position the oscillating arms 7 are locked with respect to the brackets 9 by the struts 20, and the backrest 3 is itself locked with respect to the oscillating arms 7 by the hooks 26.

Figure 12:
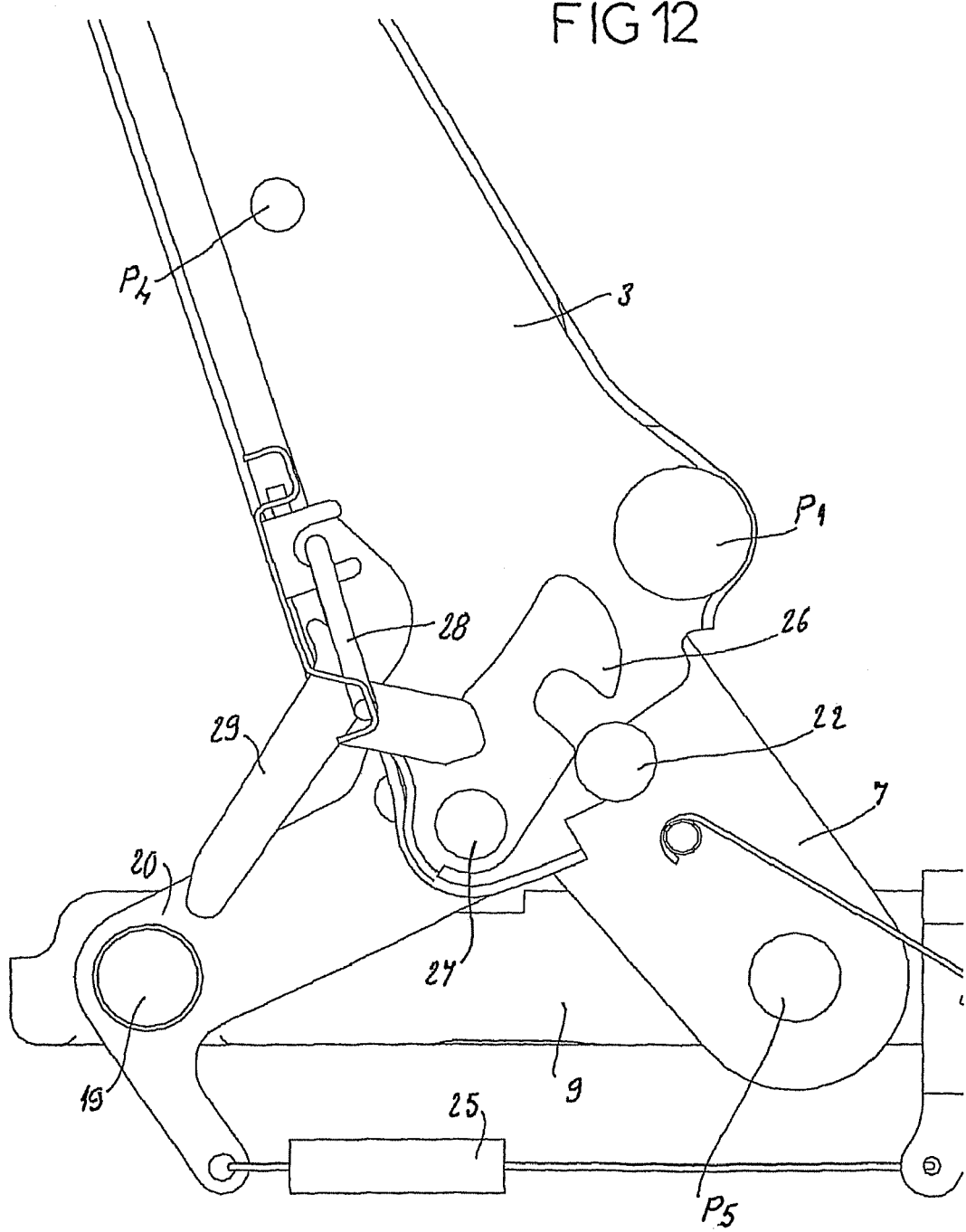

To operate the hooks 26, the hooks disengage from each pin 22 on which they are engaged, releasing the backrest 3 from the arms 7 as can be seen in FIG. 12. This allows the backrest 3 to rotate relative to the pivot connection P4.

Figure 5:
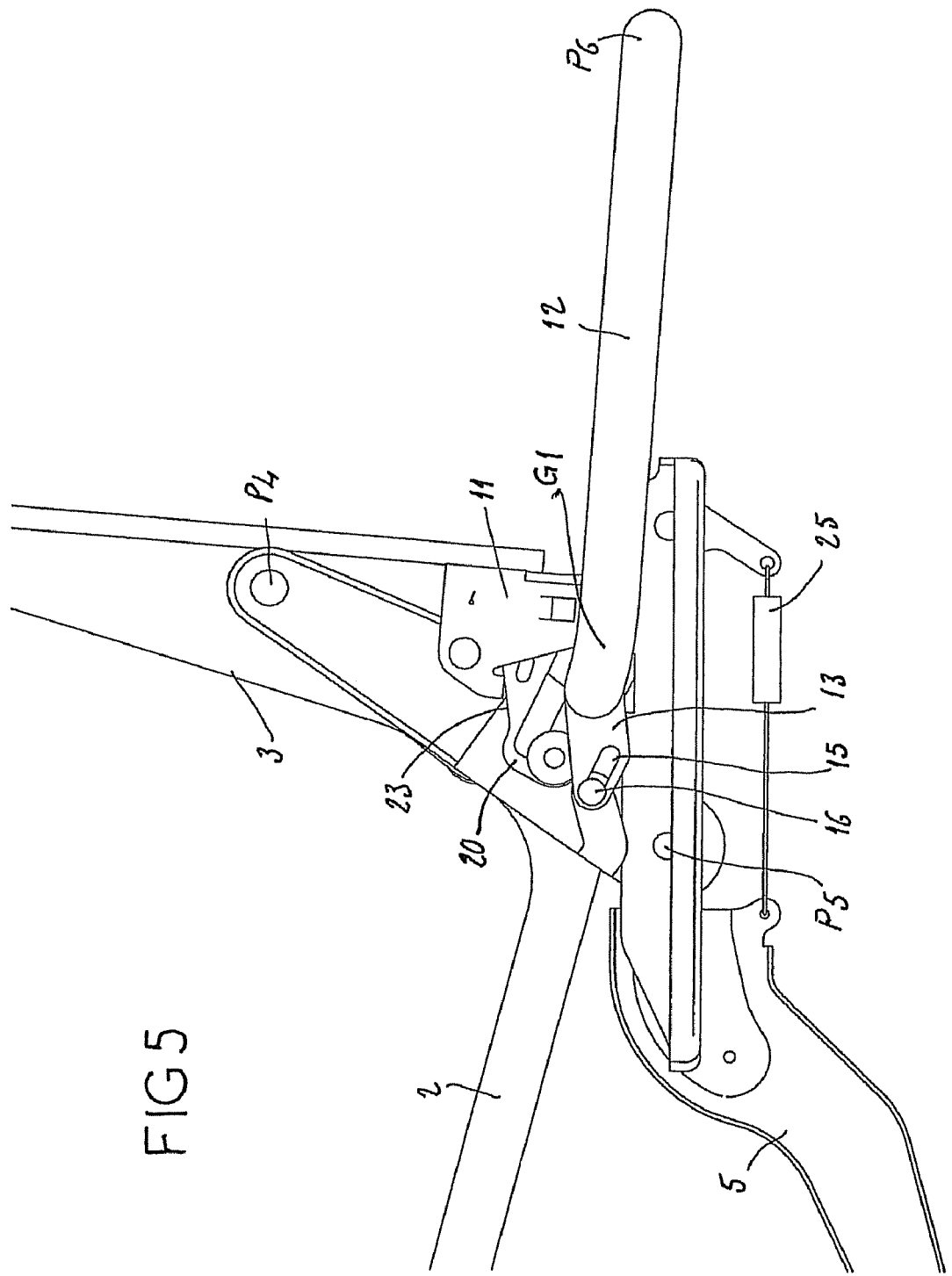

The backrest 3 can then begin its forward movement. FIG. 5 illustrates this condition of the seat. Notice in this figure that the support plate 11 which is connected to the backrest 3 has moved with respect to the arm 7 until the cam 24 is bearing on the ramp 23. FIG. 9, in which the support plate 11 is not depicted, shows clearly the position of the cam 24.

Figure 11:
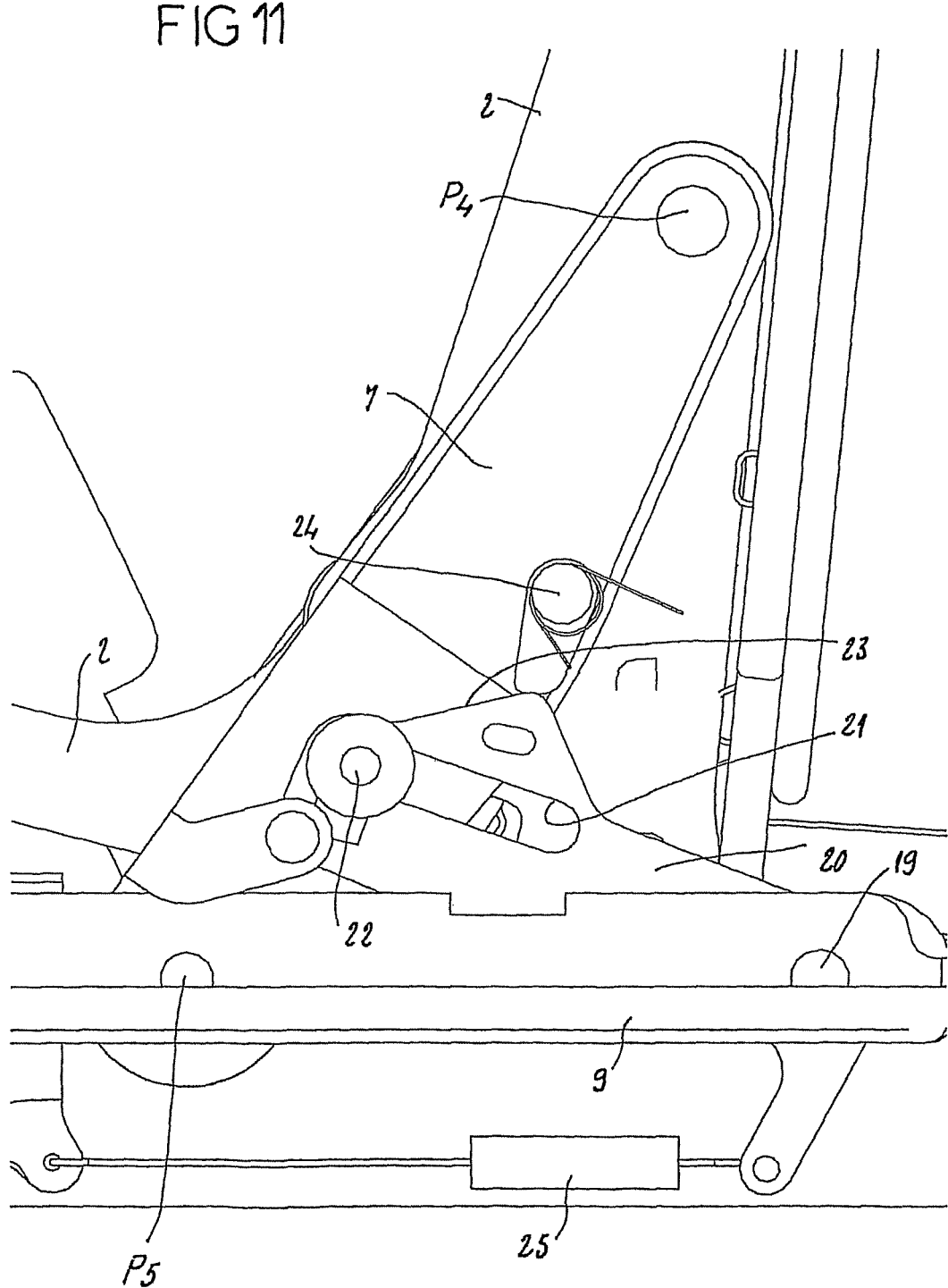

As the rotation of the backrest 3 is continued, the cam 24 slides along the ramp 23 and thus causes the strut 20 to pivot until the pin 22 is in the elongate part of the L-shaped slot 21, allowing the arm 7 to move free of the bracket 9. The unlocking of the arm 7 is illustrated in FIG. 11.

It will be realized that the seat has been unlocked in two steps. First the backrest 3 is unlocked from the oscillating arms 7, and then the oscillating arms 7 are unlocked from the brackets 9.

Figure 6:
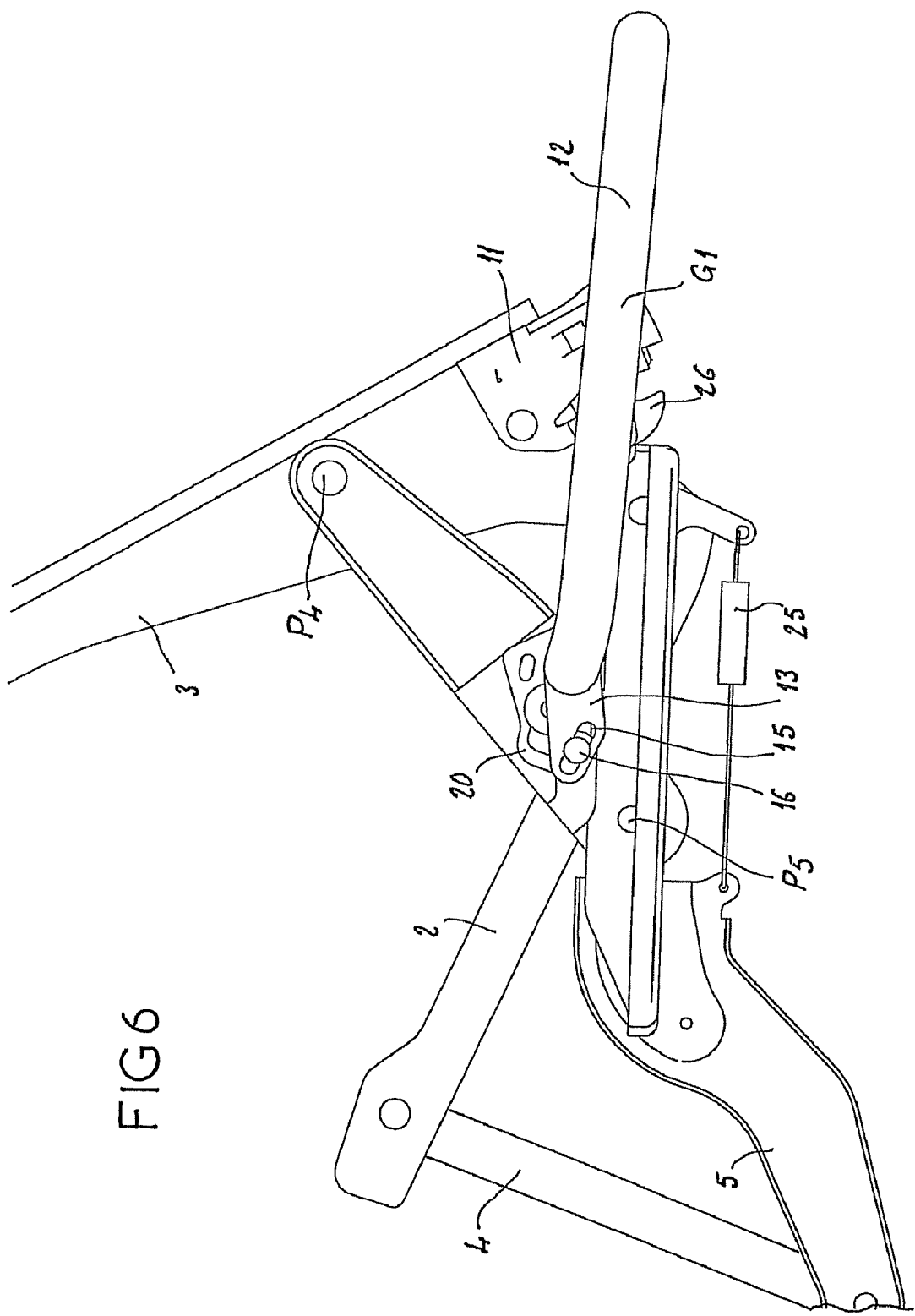

FIG. 6 shows how seat folding continues, with the backrest 3 being lowered towards the thigh support 2 by a pivoting of the latter about the pivot connection P4, while the backrest 3 and each oscillating arm 7 pivot in the opposite direction.

As the thigh support 2 is connected by the pivot connection P1 to the backrest 3, it moves down toward the floor.

An essential point to be stressed in the backrest closing movement is that the backrest is guided by the rail 12: a simple closing down of the backrest 3 onto the thigh support 2 is ruled out. Owing to the action of the rails 12, the closing of the backrest 3 necessarily involves a downward and rearward movement of the backrest accompanied by the oscillating arms 7 and by the thigh support 2.

The function of the pressings 13 is important in the folding kinematics. As can be seen in FIG. 6, each pin 16 is engaged in the slot 15 and guides the movement of the rails 12; the rails 12 thus provide support for the rollers 14.

Figure 7:
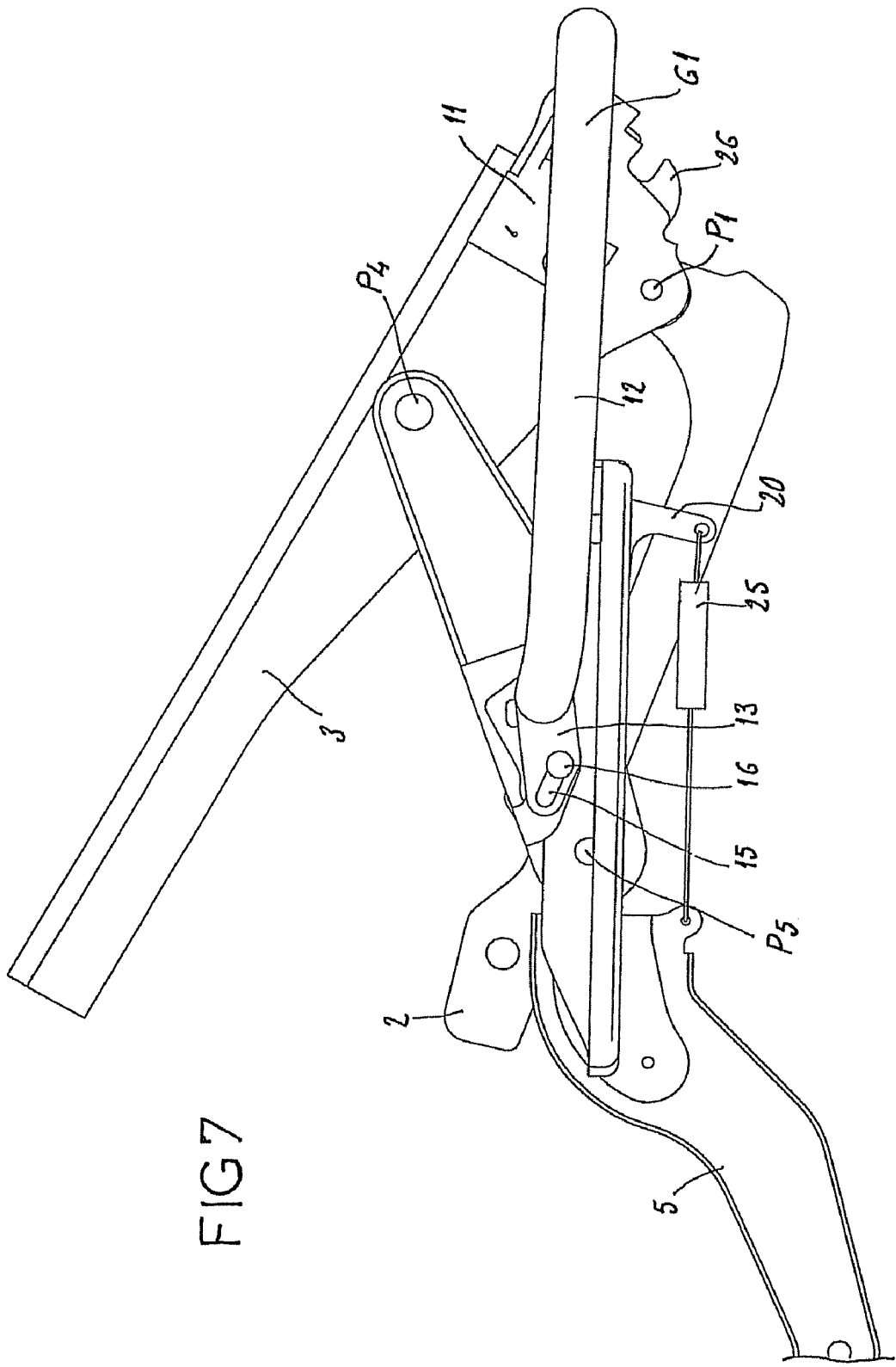

FIG. 7 shows the seat as it continues its folding motion. As shown in the figure, each pin 16 is at the end of its travel inside the slot 15. At this stage folding continues under gravity: the oscillating arms 7 and the legs 4 pivot backward relative to the connections P5 and P3 respectively, while the backrest 3 pivots forward relative to the connection P4.

As the rotation continues (FIG. 7), the backrest 3 is flat on the thigh support, which itself is in a sunken position resting on the bottom of the floor.

Figure 8:
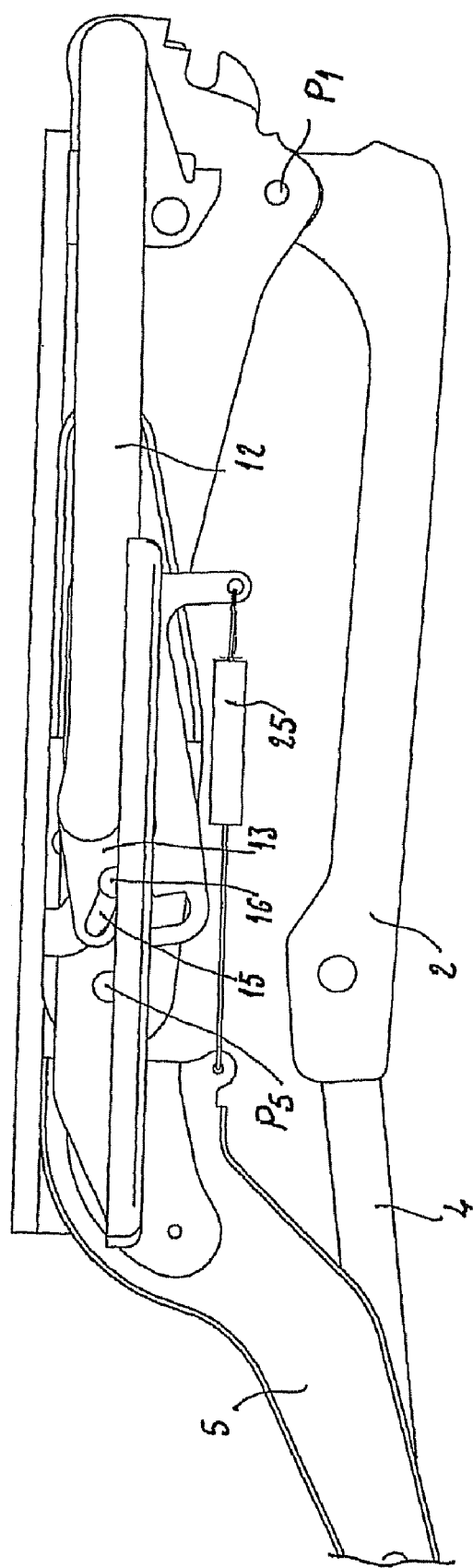

FIG. 8, which shows the seat in the folded position, is extremely interesting because, as this figure shows, the seat in its folded position is extremely compact.

The rails 12 are also extremely useful when a user wishes to unfold a seat, because they prevent the backrest from being lifted by its rear end.

Figure 13:
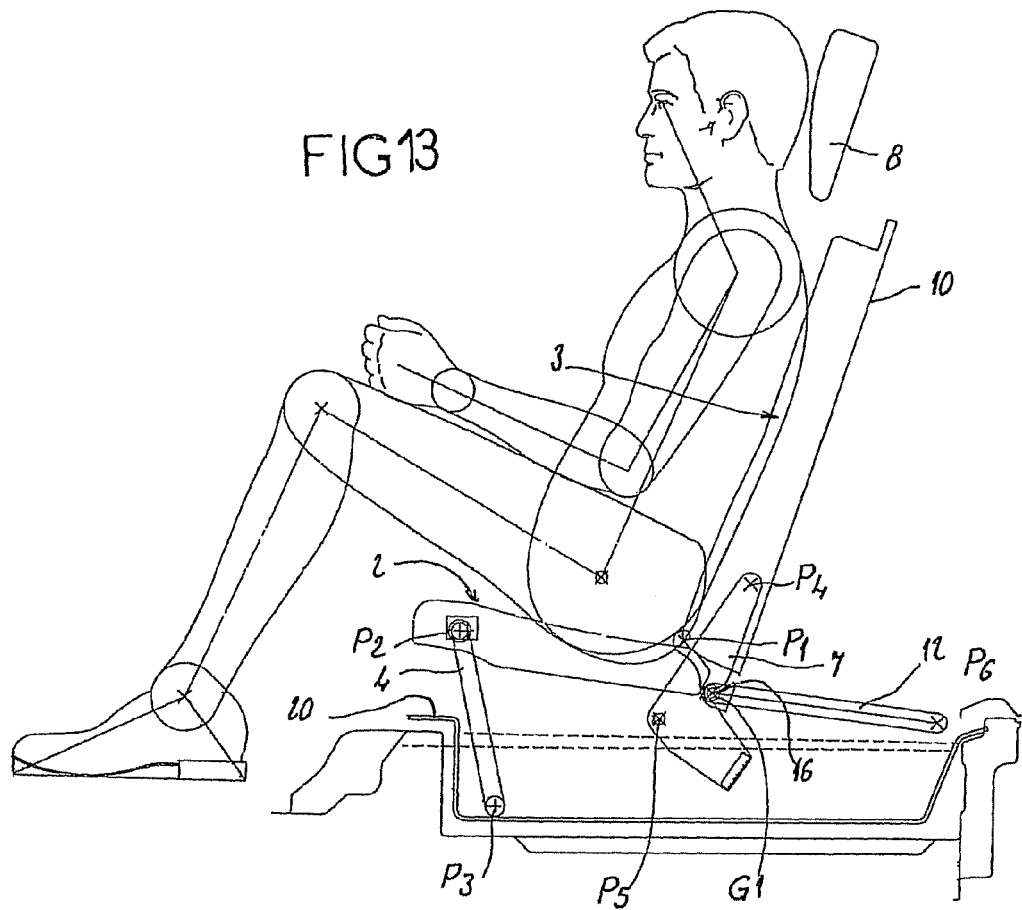
FIGS. 13 and 14 are schematic views of a seat according to the invention in the unfolded and folded positions.
Figure 14:
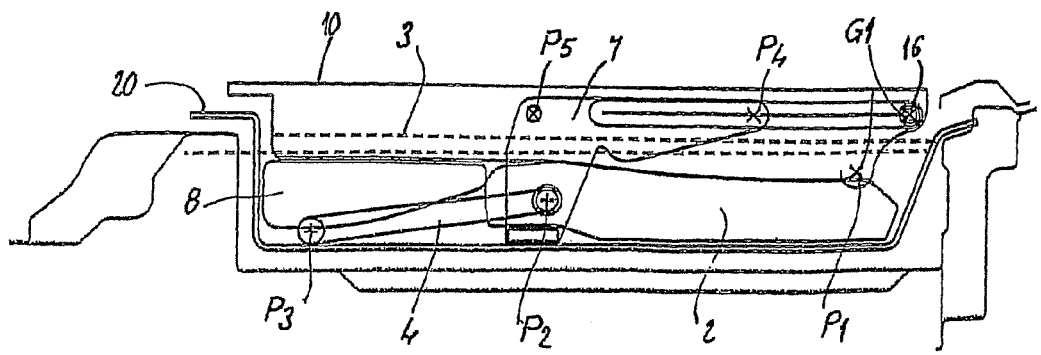

FIGS. 13 and 14 succinctly summarize the advantages of the seat according to the invention.

FIG. 13 shows the seat mounted in a well 20 let into a floor 21 of the vehicle. The upward displacement of the backrest 3 to give the passenger an area of support sufficient to rest the whole of his back may clearly be made out. It will also be noticed that the unfolded seat is directly above the well 21.

In FIG. 14, meanwhile, the seat will be seen to be extremely compact in both the longitudinal and vertical directions when folded.

A supplementary feature whereby the seat is made even more space-saving in its folded condition is that the headrest 8 is stored between the legs 4.

These figures demonstrate the remarkable feature of the invention whereby the backrest 3 is equal to the longitudinal dimension of the well 21 (see FIG. 14), but the backrest 3 is displaced upward when the seat is in the unfolded position (see FIG. 13). It can be seen that the plate 10 closes off the whole of the well 21, so that when the seat is stowed away there are no parts left sticking up.

The invention therefore provides a seat that maximizes the height of its backrest, and it can be stowed away in a configuration of extremely small volume.

This seat, which is particularly applicable to row 3 of people carrier or station wagon type vehicles, substantially increases the comfort and safety of a passenger sitting in it.

The invention is not of course limited to the embodiment described above by way of example: on the contrary, it covers all alternative embodiments thereof.

The invention claimed is:

1. A motor vehicle seat comprising:
a backrest,
a thigh support connected to the backrest by a pivot connection and to a vehicle floor by a front underframe,
at least one oscillating arm connected by two pivot connections to the backrest and to the vehicle floor or a bracket disposed in proximity to the vehicle floor, the seat being movable between:
an unfolded condition in which the thigh support is approximately parallel to the floor and the backrest approximately vertical, each oscillating arm being in line with the backrest, so that the backrest is extends relatively upward, and
a folded condition in which the backrest is closed down approximately horizontally on the thigh support,
wherein, when moving from the unfolded condition to the folded condition, each oscillating arm pivots in a direction opposite to the pivoting direction of the backrest allowing disposal alongside the backrest
wherein it has the seat includes guide means for the backrest when the seat is being moved from its unfolded condition to its folded condition, wherein the backrest is provided with at least one roller that travels in at least one rail, connectable to the floor, when the seat is moving, and
wherein each rail is connected by a pivot connection to the floor, and forms an acute angle with the floor when the seat is in the unfolded position and forms a null angle with the floor when the seat is in the folded position.

2. The seat as claimed in claim 1, wherein the seat in its folded condition is housed in a well in the floor of the vehicle, a length of the backrest being less than or equal to a longitudinal dimension of the well.

3. The seat as claimed in claim 1, wherein the end of each rail is fitted with a pressing having a slot that houses a pin projecting from each oscillating arm.

4. The seat as claimed in claim 1, wherein the seat inlcudes two oscillating arms situated on the outer faces of the backrest.

5. The seat as claimed in claim 1, wherein the front underframe possesses two parallel legs between which a headrest supported by the backrest is engaged when the seat is in the folded position.

6. The seat as claimed in claim 1, wherein the seat includes two rails, with a roller traveling in each of them.

7. The seat as claimed in claim 1, further comprising first means for locking an upper part of the backrest relative to a lower part of the backrest and second means for locking the lower part of the backrest relative to the floor.

8. The seat as claimed in claim 7, further comprising means for sequencing the first locking means and second locking means which, when the seat is in the unfolded position, allow initially the first locking means and then the second locking means to be released.

9. The seat as claimed in claim 7, wherein the backrest is fitted with a hook that pivots between a backrest-locked position in which the hook is engaged on a pin projecting from the arm, and a backrest-unlocked position in which the hook is disengaged from the pin.

10. The seat as claimed in claim 9, wherein, on an outer face of each arm, a pin is disposed, -the pin engaging in an L-shaped slot that has an elongate part and a recess, the slot being formed in a strut with a pivot relative to the bracket between a position in which each arm is locked relative to the bracket such that the pin is immobilized in the recess of the slot, and a position in which each arm is unlocked relative to the bracket such that the pin can travel along the elongate part slot.

11. The seat as claimed in claim 10, wherein the strut (20) is kept in its position of locking the arm relative to the bracket by a tension spring and comprises a ramp against which a cam connected to the backrest bears during the rotation of the backrest in order to release the pin from the recess of the slot and unlock the arm from each bracket.

12. A motor vehicle seat comprising:
a backrest,
a thigh support connected to the backrest by a pivot connection and to a vehicle floor by a front underframe,
at least one oscillating arm connected by two pivot connections to the backrest and to the vehicle floor or a bracket disposed in proximity to the vehicle floor, the seat being movable between:
an unfolded condition in which the thigh support is approximately parallel to the floor and the backrest approximately vertical, each oscillating arm being in line with the backrest, so that the backrest is extends relatively upward, and
a folded condition in which the backrest is closed down approximately horizontally on the thigh support,
wherein, when moving from the unfolded condition to the folded condition, each oscillating arm pivots in a direction opposite to the pivoting direction of the backrest allowing disposal alongside the backrest
wherein it has the seat includes guide means for the backrest when the seat is being moved from its unfolded condition to its folded condition, wherein the backrest is provided with at least one roller that travels in at least one rail, connectable to the floor, when the seat is moving, and
wherein the end of each rail is fitted with a pressing having a slot that houses a pin projecting from each oscillating arm.

13. A motor vehicle seat comprising:
a backrest,
a thigh support connected to the backrest by a pivot connection and to a vehicle floor by a front underframe,
at least one oscillating arm connected by two pivot connections to the backrest and to the vehicle floor or a bracket disposed in proximity to the vehicle floor, the seat being movable between:
an unfolded condition in which the thigh support is approximately parallel to the floor and the backrest approximately vertical, each oscillating arm being in line with the backrest, so that the backrest is extends relatively upward, and
a folded condition in which the backrest is closed down approximately horizontally on the thigh support,
wherein, when moving from the unfolded condition to the folded condition, each oscillating arm pivots in a direction opposite to the pivoting direction of the backrest allowing disposal alongside the backrest;
first means for locking an upper part of the backrest relative to a lower part of the backrest and second means for locking the lower part of the backrest relative to the floor; and
a means for sequencing the first locking means and second locking means which, when the seat is in the unfolded position, allow initially the first locking means and then the second locking means to be released.

14. A motor vehicle seat comprising:
a backrest,
a thigh support connected to the backrest by a pivot connection and to a vehicle floor by a front underframe,
at least one oscillating arm connected by two pivot connections to the backrest and to the vehicle floor or a bracket disposed in proximity to the vehicle floor, the seat being movable between:
an unfolded condition in which the thigh support is approximately parallel to the floor and the backrest approximately vertical, each oscillating arm being in line with the backrest, so that the backrest is extends relatively upward, and
a folded condition in which the backrest is closed down approximately horizontally on the thigh support,
wherein, when moving from the unfolded condition to the folded condition, each oscillating arm pivots in a direction opposite to the pivoting direction of the backrest allowing disposal alongside the backrest;
first means for locking an upper part of the backrest relative to a lower part of the backrest and second means for locking the lower part of the backrest relative to the floor;
wherein the backrest is fitted with a hook that pivots between a backrest-locked position in which the hook is engaged on a pin projecting from the arm, and a backrest-unlocked position in which the hook is disengaged from the pin.

* * * * *